United States Patent [19]

Childers et al.

[11] Patent Number: 5,097,361
[45] Date of Patent: Mar. 17, 1992

[54] CONTROLLING POSITION OF A ROTATABLE TRANSDUCER IN DEVICES EMPLOYING SUCH TRANSDUCERS

[75] Inventors: Edwin R. Childers; Alan A. Fennema; David P. McReynolds, all of Tucson, Ariz.

[73] Assignee: International Business Machines Corporation, Armonk, N.Y.

[21] Appl. No.: 636,871

[22] Filed: Oct. 19, 1990

Related U.S. Application Data

[63] Continuation-in-part of Ser. No. 532,782, Jun. 4, 1990, abandoned.

[51] Int. Cl.⁵ .................................................. G02B 7/02
[52] U.S. Cl. ...................................... 359/824; 359/814; 359/823
[58] Field of Search ...................... 350/247, 255; 369/44.11–44.19, 44.21–44.30; 359/811–830

[56] References Cited

U.S. PATENT DOCUMENTS

| | | | |
|---|---|---|---|
| 4,643,522 | 2/1987 | Takashima | 359/824 |
| 4,861,138 | 8/1989 | Suzuki | 359/824 |
| 4,998,802 | 3/1991 | Kasuga et al. | 359/814 |
| 5,046,819 | 10/1991 | Childer | 359/824 |

*Primary Examiner*—Bruce Y. Arnold
*Assistant Examiner*—Thong Nguyen
*Attorney, Agent, or Firm*—H. F. Somermeyer

[57] ABSTRACT

An optical disk recorder, or other apparatus, use a rotary actuator for supporting a work tool, such as an objective lens which is pivotable or rotatable without a pivot pin. Rotation causing or tracking coils on the rotary actuator are disposed adjacent to permanent magnets to selectively effect rotation of the rotary actuator about the pivot pin. A bias electrical current is supplied to these coils to generate magnetic fields which are in opposite rotational senses; such fields force the rotary actuator against the pin in such a manner that the point of contact between the rotary actuator and the pin follows the rotation of the actuator about the pin.

22 Claims, 2 Drawing Sheets

CONTROLLING POSITION OF A ROTATABLE TRANSDUCER IN DEVICES EMPLOYING SUCH TRANSDUCERS

RELATED APPLICATION

This application is a continuation-in-part of Ser. No. 07/532,782 filed June 4, 1990, now abandoned.

FIELD OF THE INVENTION

The present invention relates to actuators, particularly rotary actuators in which vibrations and wobble are to be controlled. In particular, the invention is applicable to optical disk recorders in which an objective lens is mounted for movement in focus and track following/seeking directions on a rotary actuator (lens holder).

BACKGROUND OF THE INVENTION

Optical disk recorders have often employed rotary lens holders in which the lens is axially moveable in the holder along the optical axis of the lens. Such motions enable focusing operations to occur using the objective lens. Further, the rotational mode of the lens holder enables the lens to be moved from a record track to an adjacent record track or a plurality of such record tracks by a track seek operation, as is known. Such a lens holder is usually located on a head carriage, also termed a coarse actuator in which an upstanding pin slidable and rotatably receives a lens holder. In optical disk recorders, because of extremely high track density and lineal recording densities, any tolerances between the upstanding pin and the lens holder cause vibration and introduce an independent variable which has to be accommodated by servo circuits. In many instances, the wobbling or other action of the rotatable lens holder (also termed actuator) relative to the head or transducer carriage becomes significant at track spacings of about one micron and with a substantial linear density in which the cells are a micron or less in length along the track.

Similar problems occur in other recorders such as so-called hard disk recorders in which the magnetic transducer is rotatably mounted for track crossings and for track seekings. As the track densities of such hard magnetic hard disks increase the sensitivity to the tolerances of the pivoting rotatable support becomes more and more critical. Accordingly, it is desired to provide a simple and efficient control of the relationship between a rotatable actuator or transducer holder (also termed working tool holder) and its support whether it be on a head carriage or on a frame of a device that uses such a rotatable actuator.

DESCRIPTION OF THE PRIOR ART

Terayama et al. in U.S. Pat. No. 4,687,296 shows a rotatable objective lens holder for use in an optical disk environment. An elastic press member is connected on the frame supporting the rotary actuator/lens holder such that as a lens holder pivots or rotates the press member is distorted for removing vibration in the track following or seeking direction, i.e., in a direction perpendicular to the optical axis of the objective lens. The elastic press member (as best seen in FIG. 5 of this reference) also elastically pulls the rotary lens holder against a pivot pin about which it rotates. According to the reference, the elastic press member reduces the vibration in the tracking direction i.e., rotational motion of the objective lens holder The force exerted by the elastic press member on the rotary lens holder changes as the lens holder rotates about the center pivot pin such that the force on the pivot pin by the rotary objective lens holder appears to be in a constant position on the pin as opposed to following the rotation of the lens holder as it rotates about the pin i.e., the force of the elastic press member does not follow the rotation of the objective lens holder, therefore it does not provide a constant force on an axis between the pivot axis of the pin and the optical axis of the lens. It is believed that keeping the force aligned with the rolling contact between the rotary actuator/lens holder and the pivot pin provides an optimum operative relationship between such rotary actuator/lens holder and the pivot pin. It is further believed that the friction involved between the pivot pin and the rotary actuator is maintained at a more constant and predictable value when the contact follows the rolling motion of the actuator that is provided by the arrangement in this reference. The objective lens is usually the heaviest element on the rotary actuator which provides for further interest in maintaining the force of holding the lens holder against the pivot pin to be aligned with the center of gravity of the objective lens. It is believed that this would be the optimum way for reducing vibration and providing consistent and predictable results of the rotatable action of the lens holder as well as the pivot axis slidable action of the lens holder on the pivot pin.

VanRosmalen in U.S. Pat. No. 4,638,471 shows as focus control of an objective lens having two sets of magnet coils wherein the signals have the same amplitude and frequency but are in phase opposition for causing the objective lens to be tilted periodically about one of the two axis transfers to the chief ray for optical axis of the radiation beam. This patent is cited for its showing of plural signals and a phase relationship of superposed signals for controlling an objective lens. Functions provided by this reference are quite different from that taught and claimed by the present invention. A similar teaching by Gijzen et al. in U.S. Pat. No. 4,773,055 shows a first coil causes axially motion of the objective lens while a second coil causes tilting motion of the objective lens. There is no control shown here which relates to controlling the relationship between a pivot pin and a rotary actuator.

Tsurushima et al. in U.S. Pat. No. 4,482,988 shows a rotary lens carrier/actuator of a optical disk device which has both focusing and tracking/seeking coils on the rotary actuator. This reference does not show urging a rotary member against a pivot pin as taught by the present invention.

Musha U.S. Pat. No. 4,386,823 is cited for its showing of magnetic coils positioning an objective lens in a rectangular mount. This patent shows another arrangement for controlling an objective lens.

Suzuki in U.S. Pat. No. 4,861,138 shows a rotary actuator for an optical disk recorder in which the rotary actuator rotates about and axially slides upon a support pin. This patent uses a particular magnet/coil arrangement and does not suggest how to accommodate tolerances between a pivot pin and its supported rotary actuator.

Ichikawa et al. U.S. Pat. No. 4,838,649 shows another rotary actuator pivotally about a pivot pin and having an objective lens off-set from the pivot pin with an optical axis parallel to the pivot pin. This patent teaches putting the center of gravity of the rotatable actuator at the pivot axis and a spring member which has high rigidity to the translation in the tracking direction (transfers to the optical axis and pivot axis) and low rigidity to rotation in a plane intersecting the slide shaft at right angles.

Yumura et al. in U.S. Pat. No. 4,862,441 shows another optical disk objective lens actuator/holder carried on a linearly translatable coarse actuator or transducer carriage.

Estes U.S. Pat. No. 4,799,766 shows the positioning of an objective lens in both the focusing and tracking directions using only magnetic levitation. VanRosmalen in U.S. Pat. No. 4,557,564 shows a rotary actuator which does not provide the operation of the present invention but does show a rotary actuator as used not only in optical disk but also in the hard disk referred to above.

SUMMARY OF THE INVENTION

In accordance with the invention, a rotary actuator carrying a working tool, such as a magnetic transducer, objective lens tracking mirror or the like, is mounted for movement about a pivot pin. Support means, as a head carriage, intercouple the rotary actuator and a frame member. The arrangement on the head carriage is such that the rotary actuator is forced against the pivot pin at a point which follows the rotation of the rotary actuator. In preferred form of the invention, the rotary actuator is not only rotatable about the pin but also axially slidable thereon. In a preferred construction of the invention, the tracking/seeking or rotational actuation of the rotary actuator is by a set of coils on the actuator which are placed in a magnetic cooperative relationship with permanent magnets. Electrical currents passing through one or more of the coils cause rotation of the rotary actuator by the interaction of the permanent magnet fields with the magnetic field generated by the currents in the coils. In one arrangement, a bias electric current flowing through the coils urges the rotary actuator against the pin. In this arrangement, the rotation-causing electrical currents are superposed on the bias current such that the coils provide for biasing the rotary actuator against the pin as well as rotation control of the actuator about the pin. In another arrangement, the electrical signals effecting rotation of the working tool provide side bias. It is preferred that the point of contact be in a line which extend radially from the pivot axis through a center point of the work tool such as an objective lens or transducer.

The foregoing and other objects, features and advantages of the invention will be apparent from the following more particular description of preferred embodiments of the invention, as illustrated in the accompanying drawings.

DETAILED DESCRIPTION OF THE DRAWINGS

Figure 1:
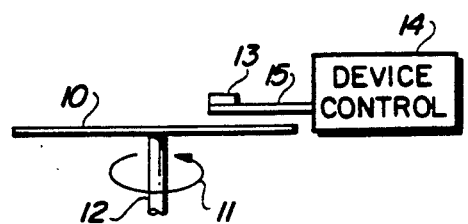
FIG. 1 is an abbreviated diagrammatic showing of an optical disk device in which the present invention may be employed.
Figure 2:
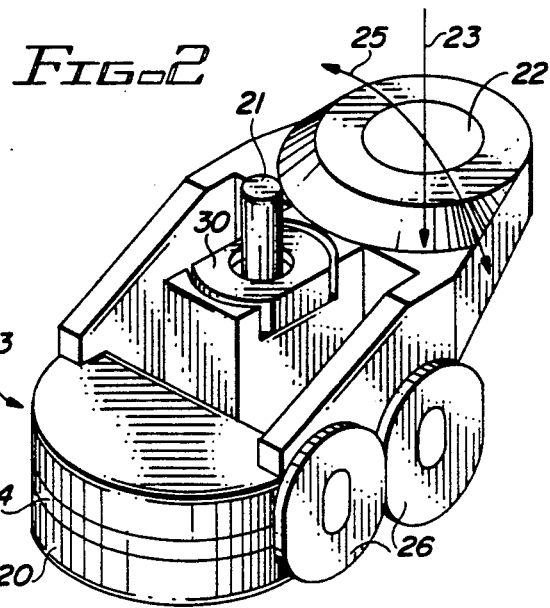
FIG. 2 illustrates a rotary actuator/lens holder with which the present invention may be employed and which is rotatably and slidable mounted on a pivot pin.

Referring now more particularly to the appended drawing, like numerals indicate like parts and structural features in the various figures. Optical disk 10 rotates in the direction of arrow 11 about its rotational axis 12. Disk 10 is suitably mounted for rotation on a suitable electric motor (not shown). A fine actuator 13 is mounted on the distal end of head carriage 15. Head carriage 15 is controlled by device control 14 and is movable on the frame (not shown) of the device in a usual manner. Fine actuator 13 in the illustrated embodiment carries a working tool 22. Working tool 22 can be a magnetic transducer, optical mirror, objective lens, or other work providing element. The discussion hereafter refers to working tool 22 as an objective lens 22. Fine actuator 13 carries objective lens 22 in a manner for enabling focusing actions i.e., motions toward and away disk 10 along the optical axis of the objective lens and for track following and seeking by rotational motion orthogonal to the optical axis 23 of lens as represented by arrow 25 (FIG. 2). Arrow 25 extends radially of disk 10 for crossing a series of tracks. Additionally, head carriage 15 is radially movable for locating fine actuator 13 in a predetermined radial area of disk 10.

Figure 3:
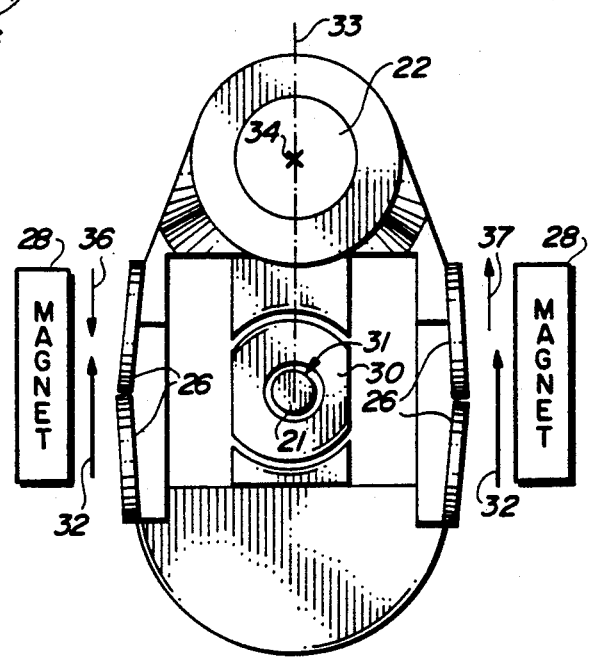
FIG. 3 is a simplified plan view of the FIG. 2 rotary actuator and shows the relationship of tracking a rotating causing coil with permanent magnets.

Referring now more particular to FIG.'S 2 and 3, a pivot pin 21 is mounted on head carriage 15 which is a support frame for fine actuator 13. Fine actuator 13 includes a body 20, preferably molded and having a beam shape which is off-set for enabling the lens 22 to be inserted into a disk cartridge (not shown). A focusing coil 24 extends around the pivot pin 21 on body 20. A pair of tracking coils 26 are disposed on opposite sides of the body 20, as best seen in FIG. 3. A pair of magnets 28 are mounted in an upstanding manner on head arm 15 to be in close magnetic association with the tracking coils 26 and the focus coil 24. For some applications, a hardened insert 30 mounted on body forms a slide bearing about pivot pin 21 for enabling the fine actuator 13 to rotate about the pivot pin 21 and slide axially thereon about its pivot axis which is the center axis of pin 21. Because of the tight tolerances involved, any space 31 between pivot pin 21 and hardened bearing insert 30 can cause unintended wobble or vibration of body 20 with respect to pivot pin 21. It is desired to minimize these motions in an inexpensive and effective manner.

In accordance with the invention, the coils 26 are not only used for imparting rotational motion to fine actuator 13, but also to provide a bias magnetic field by a bias current flowing therethrough for producing the magnetic force indicated by arrows 32. Such magnetic force forces the body 20 in the direction of the arrows 32 for pressing the body 20 against pivot pin 21 at a point represented by line 33 which also goes through the optical axis 34 of lens 22. It should be noted that the bias magnetic force represented by arrows 32 is superposed upon the magnetic force 36, 37 generated by tracking coils 26 and magnets 28 for effecting rotational motion of actuator 13. The control electrical currents flowing through coils 26 operate to produce forces that are in the same rotational sense. That is, to rotate body 20 counterclockwise, a magnetic force represented by arrows 36 and 37 causes a reaction between the body 20 and magnets 28. For clockwise rotation, the magnetic forces represented by arrows 36 and 37 are reversed. In this regard, it should be noted that the bias magnetic force represented by arrows 32 are in opposite rotational senses, such that no rotational effect is imposed upon the fine actuator 13. Superposing the rotational causing magnetic forces with the bias forces, effects a superposition of the forces for maintaining the bias force to effect contact between body 20 and pin 21 always on line 33. Therefore, as body 20 rotates, the biasing force follows the rotation as the body 20 rotates or pivots about pin 21. This arrangement maintains the biasing force for keeping the pin 21 and body 20 together along line 33, whether it be on the side of pin 21 closest to lens 22 or on the opposite side is of no consequence. This arrangement also provides for a maximum balance in the fine rotary actuator 13. It is understood that the magnets 28 can be mounted on the actuator 13 with the coils 26 mounted on support 15.

Figure 4:
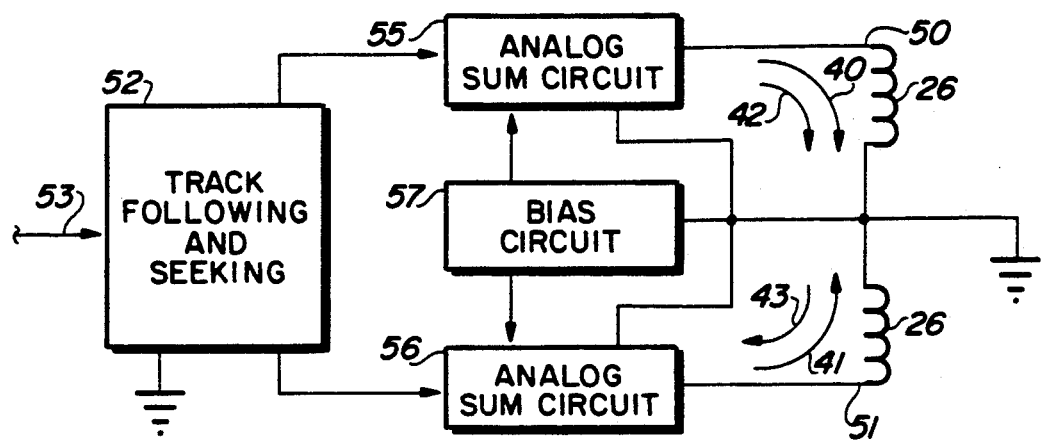
FIG. 4 is a block diagram showing the functional aspects of the present invention as applied to the FIG.'S 2 and 3 illustrated rotary actuator.
Figure 6:
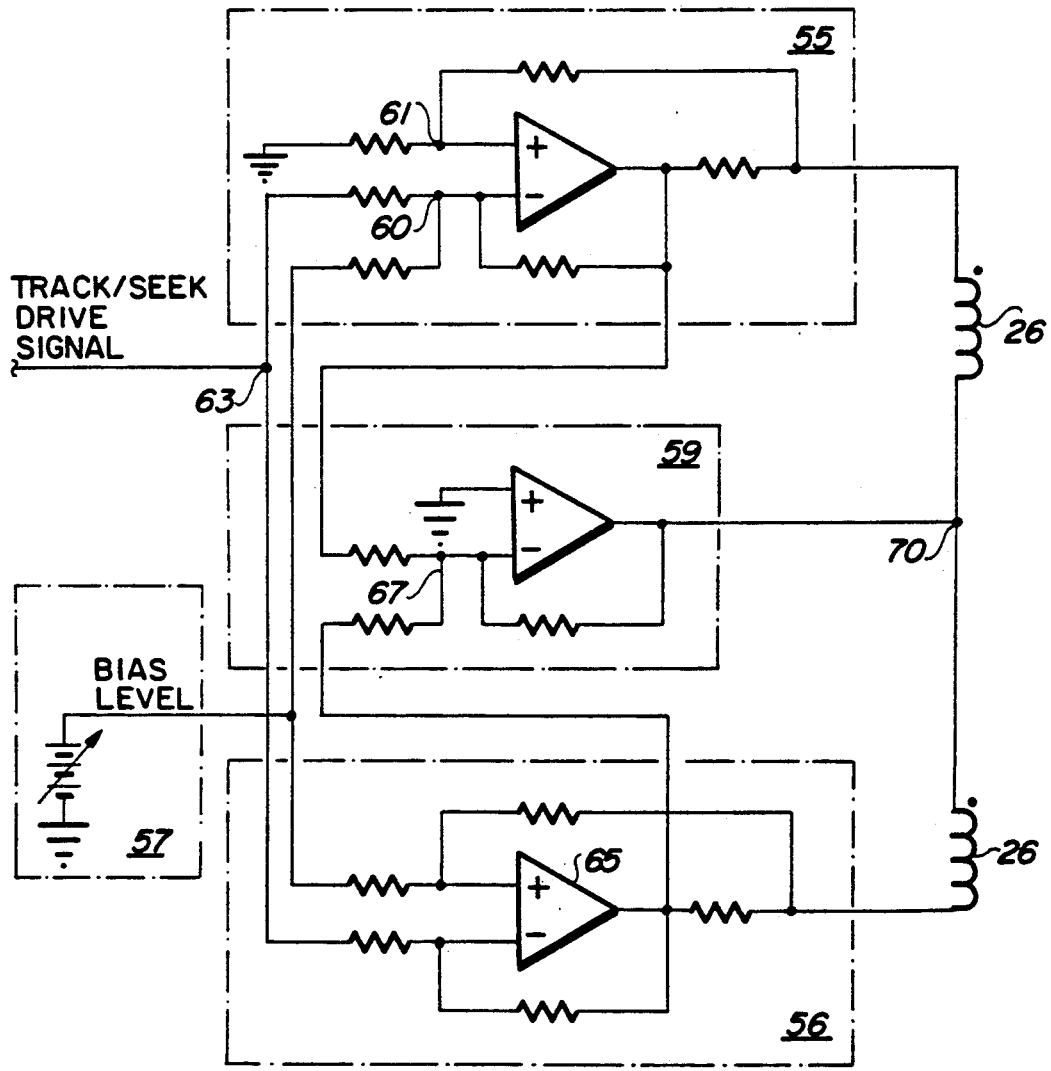
FIG. 6 is a simplified circuit diagram of a practical circuit for practicing the present invention with the FIG.'S 2 and 3 illustrated actuator.

The winding direction of the coils 26 and the direction of currents flowing therein, determine the direction of rotation and the direction of bias forces produced. Since this relationship is understood and is a design matter, it is not further discussed. FIG. 4 shows a functional representation for effecting the forces described with respect to FIG. 3 while FIG. 6 shows a constructed embodiment of such a circuit. The coils 26 are arranged to produce a magnetic force (as described above) when the electrical current flowing there through for rotating the body 20 as indicated by the arrows 36 and 37 magnetic forces by currents 40 and 41. Reversing the coil winding directions would cause a reversal of current direction. In the FIG. 4 illustration, the current direction represented by arrows 40 and 41, generates the oppositely directed magnetic forces 36 and 37 for effecting rotational torque on fine actuator 13. In contrast, to generate the bias magnetic forces, represented by arrows 32, the current flows in the same direction as represented by arrows 42 and 43. The superposition of the current flowing through the coils 26 from coil ends 50 and 51 above use analog sum circuits 55 and 56, respectively. A track following and seeking circuit 52 receives control signals from device control 14 as represented by double headed arrow 53. Circuit 52 supplies control signals through analog sum circuits 55, 56 to coil ends 50 and 51, respectively, for the coils 26 for effecting rotation of the actuator 13. In contrast, bias circuit 57 is connected to the ends 50 and 51 of the coils 26 via the analog sum circuits 55 and 56, respectively, which causes superposition of the electrical currents in the two coils 26.

Figure 5:
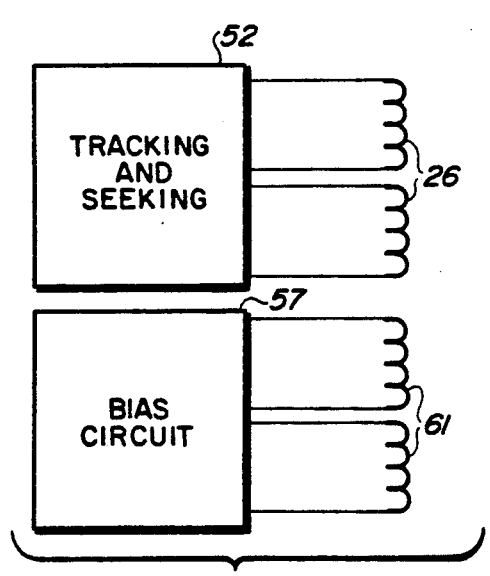
FIG. 5 shows an alternate embodiment of the invention as can be practiced with the FIG.'S 2 and 3 illustrated rotary actuator.

Although a best mode of practicing the present invention is to use the tracking coils 26 as shown in FIG. 4 and 6, separate coils for the bias circuit can also be provided if desired. As best seen in FIG. 5, tracking and seeking circuit 52 is directly connected to coils 26 for providing the rotation effecting magnetic forces. The bias circuit 57, instead of being connected to coils 26 is connected to a set of bias coils 61 which can be interwound with coils 26 for providing the bias magnetic force represented by arrows 32.

FIG. 6 is a simplified schematic diagram of a constructed embodiment of the present invention. The pair of tracking coils 26 have a common connection to a reverse signal amplifier 59 which is controlled by the summing amplifier circuits 55 and 56. The bias circuit 57 is a variable battery (DC) source applied to summing amplifier 55 at its current summing node 60, its active input. The second input to the summing amplifier is a reference signal source 61. The second input to current summing node 60 is the tracking drive signal on line 63 received from track following and seeking circuit 52. While FIG. 4 shows circuit 52 supplying differential signals to summers 55 and 56, the FIG. 6 embodiment uses a single input. The differential signal action is effected through differential amplifier 65 of summing amplifier 56. In summing amplifier 56, rather than summing the bias signal with the tracking/seeking signal at a signal summing node 60, differential amplifier 65 receives the bias signal at one input and the line 63 tracking and seeking signal at its second or differential input for subtracting the two signals. The output signals of amplifiers 55 and 56 are supplied not only to the extreme connections of coils 26, but also to a summing node 67 in reverse signal amplifier 59. This connection controls amplifier 59 such that reverse currents flow in the two coils 26 create a magnetic forces 36 and 37 for seeking and tracking. The bias signal input to both amplifiers 55 and 56 causes current flow in the coils to produce bias forces 32. Note that in FIG. 6 the center connection 70 of coils 26 is not grounded as in FIG. 4. Amplifier 59 enables higher amplitude opposing voltages at the coil extremities resulting in faster tracking action. The analog sum circuits 55 and 56 of FIG. 4 include active amplifiers similar to the FIG. 6 illustrated circuits. Other circuit arrangements can be employed, as desired.

Figure 7:
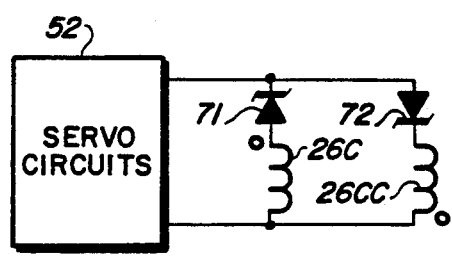
FIG. 7 is a simplified circuit diagram of a second embodiment of the invention.

FIG. 7 shows an energy efficient version of the invention. Instead of applying a separate bias current to the tracking coils 26, the positioning currents from the tracking and seeking circuits 52 bias rotor body 20 against pivot pin 31. This arrangement eliminates a need for bias circuit 57 and summing amplifiers 55 and 56. The same desired orientation of the bias, i.e. the bias force follows the rotation of the rotor body 20, is maintained. In the first-described embodiment, the positioning currents in the two tracking coils are equal resulting in no net biasing of the body 20 against pivot pin 31. The circuit of FIG. 7 provides for one tracking coil to provide more of the rotation-inducing torque and simultaneously biases the body 20 against pivot pin 31.

A pair of Zener diodes 71 and 72 respectively connect the tracking coils 26C (rotate body 20 clockwise) and 26CC (rotate body counterclockwise) to servo circuits 52. For clockwise rotation, the torque-inducing current flows through coil 26C for producing the torque and the side bias pushing body 20 against pivot pin 31. For counterclockwise rotation of body 20, the torque-inducing current flows through coil 26CC to produce both the rotation and side bias forces. Hence, all torque is provided by one of the two tracking coils 26C or 26CC. Since the coils are oppositely poled, the reverse direction currents produce side biasing forces in the same direction.

The Zener diodes 71, 72 limit the side bias forces. Whenever the drive signal exceeds the reverse current-conducting threshold of the Zener diodes, the non-conducting Zener diode begins to conduct diverting current from the forward-conducting Zener diode. The current flowing through the reverse-conducting Zener diode opposes the bias force thereby limiting the side bias. Such limiting limits the frictional effects between the body 20 and pivot pin 31. That is, when diode 71 if forward conducting, coil 26C is providing both the rotation-inducing torque and side bias force to body 20; coil 26CC has no current flow. When the reverse current-condition threshold of Zener diode 72 is exceeded, it begins to current conduct supplying a current through coil 26CC which opposes the bias and torque forces created by coil 26C current.

When diodes 71 and 72 are selected to be other than Zener diodes, then the reverse current threshold is not provided. Such an arrangement means that more side bias forces can be applied. Such an arrangement can be useful when the pivot pin 31 is horizontal for overcoming gravity induced side bias on body 20. It is to be understood that other circuit arrangements can be envisioned for producing similar changes in control of the torque and side bias forces without departing from the present invention.

While the invention has been particularly shown and described with reference to preferred embodiments thereof, it will be understood by those skilled in the art that various changes in form and details may be made therein without departing from the spirit and scope of the invention:

What is claimed is:

1. In an apparatus for positioning a work tool in a work apparatus wherein a working tool is moveable along an axis, a tool holder member supporting said working tool and having a circular aperture with a pivot axis, said working tool and aperture being on a first common radial line extending from said pivot axis, a frame member, an upstanding cylindrical pin having a pin axis and mounted on the frame member and extending through the aperture for rotatably mounting said tool holder member for rotation about the pivot axis, said aperture having a greater diameter than said pin such that the pivot axis and the pin axis are not always aligned, the improvement including, in combination:

means operatively inter-coupling said tool holder member and said frame member for effecting said rotating actions of the tool holder member including a first means for effecting rotation of the tool holder member about the pin; and bias means effectively coupling said tool holder member and said frame member for applying a predetermined bias force between the tool holder member and said upstanding pin which is substantially aligned with said first common radial line irrespective of the rotational position of the tool holder member with respect to the frame member.

2. In the apparatus set forth in claim 1 further including, in combination:

said first means comprising a pair of magnets disposed on a first one of said members on a line which extends to said pivot axis and a pair of coils on a second one of said members and disposed for magnetic co-action with magnets for rotating the tool lens holder member by magnetic torques created by control electrical currents respectively flowing in said coils; and said bias means having magnetic means in a magnetic cooperative relationship with the first means to supply a magnetic torque which adds to one of said magnetic torques and opposes the other one of said magnetic torques.

3. In the apparatus set forth in claim 2 further including, in combination:

said bias means having an electrical circuit for supplying a continuous DC current to both of said coils for producing opposing torques from the respective coils; and said first means including electrical circuits for supplying said control electrical currents to said coils including superposing said control electrical currents on said continuous DC current.

4. In the apparatus set forth in claim 2 further including, in combination:

said bias means including a set of bias coils on said one of the members and disposed on opposing sides of the pivot axis and circuits connected to the bias coils for supplying a bias current to the bias coils such that the bias current in the respective coils causes opposing torques on the tool holder member so as not to affect rotation of the tool holder member but to magnetically urge the tool holder member against the pin.

5. In the apparatus set forth in claim 4 further including, in combination:

said working tool is a transducer and said work apparatus is a signal recorder which uses the transducer to sense signals recorded on a record member.

6. In the apparatus set forth in claim 4 wherein said working tool is an objective lens and the work apparatus is an optical disk recorder having a disk with a recording surface and the holder is axially slidably mounted on the upstanding pin for effecting focussing of the objective lens to said recording surface.

7. In the apparatus set forth in claim 1 wherein said first means includes a pair of coils mounted on opposing outwardly facing sides of the tool holder; and said bias means comprises two diodes respectively coupled to the coils and arranged to forwardly conduct current in opposing directions in the coils.

8. In the apparatus set forth in claim 7 wherein said diodes are Zener diodes.

9. In the apparatus set forth in claim 1 further including, in combination:

said first means includes a pair of coils mounted on opposing outwardly facing sides of the tool holder, each of the coils having first and second ends and being mounted such that opposing currents in the respective coils produce opposing rotation-inducing torques to rotate the holder, the second ends of the coils being connected together;

said bias means includes first and second diodes each having a cathode and an anode, the cathode of the first diode being connected to the anode of the second diode, the anode of the first diode being connected to the first end of one of the coils and the cathode of the second diode being connected to the first end of a second one of the coils; and servo circuit means having first and second output terminals respectively connected to the second ends of the coils and to the anode-cathode connection of the diodes.

10. In the apparatus set forth in claim 9 wherein said diodes are Zener diodes.

11. In the apparatus set forth in claim 1 further including, in combination:

said first means applying a rotation effecting torque at one side of the tool holder member for causing a clockwise rotation and to a side opposite the side of the holder for causing a counterclockwise rotation of the holder such that the rotation causing torque also biases the holder against the pin; and said bias means including threshold means connected to the first means for limiting the biasing of the holder against the pin to a predetermined bias force.

12. In an apparatus for operating a work apparatus having a work element mounted on a holder member rotatable about a pivot axis and the work element being on a first radial line extending from said pivot axis, an upstanding pin on a frame member and having an axis extending along said pivot axis, said holder member being rotatably and axially slidably mounted on the upstanding pin for rotational motions about the pivot axis and slidable motions along the pivot axis, said rotational and slidable motions unintentionally including predetermined undesired motions, a set of coil means on one of the members and being disposed on opposing sides of the holder member on a second common radial line extending to the pivot axis, magnet means on a second one of the members and being magnetically coupled to said coil means for effecting said rotational motions whenever control electrical currents flow through said coil means, the improvement including, in combination:

first circuit means coupled to said coil means for supplying said control electrical currents to both said coil means both of which in combination with the magnets provide torque on the holder member in a same rotational sense for rotating the holder member about said pivot pin; and bias circuit means coupled to both said coil means for supplying a bias electrical current thereto which in combination with said magnets provide torque on the holder member in opposing rotational senses such that the holder member is magnetically urged against the pivot pin along a radial line bisecting the second radial line.

13. In the apparatus set forth in claim 12 further including, in combination:

each of said coil means is a single coil assembly; and
superposing means electrically interposed between said coil assemblies and said first circuit means and said bias circuit means for supplying and superposing said control and bias electrical currents to the respective coil assemblies.

14. In the apparatus set forth in claim 13 further including, in combination:

said one member being said holder member and said second member being said frame member; and
said given radial line being substantially coincident with said first radial line and said second radial line being substantially orthogonal to said first radial line.

15. In the apparatus set forth in claim 14 further including, in combination:

said work apparatus being a signal recorder having means for sensing signals recorded on a record member;
a light path means in the sensing means optically coupled to the record member; and
said work element being an optical element which is a part of said light path means in said sensing means.

16. In the apparatus set forth in claim 15 further including, in combination:

said signal recorder being an optical disk player, the record member being an optical disk and said optical element being an objective lens; and said work holder being axially slidable on said upstanding pin for enabling focussing actions of the objective lens.

17. A machine-effected method of operating a work apparatus, said apparatus having a frame, an upstanding pivot pin mounted on the frame and having a pivot axis, a working tool holder rotatably and axially slideably mounted on said upstanding pivot pin for enabling rotation of a working tool on said working tool holder, said working tool having a predetermined axis displaced from said pivot axis, a diametric line extending to said pivot axis, including the machine-executed steps of:

applying a rotational torque to said holder for rotating the holder about the pivot axis; and
substantially continuously applying a bias force along said diametric line extending through said pivot axis and for substantially continuously urging the holder against the pivot pin along a predetermined line extending from the pivot pin regardless of rotational position of the working tool holder.

18. In the machine-effected method set forth in claim 17 further including the machine-executed steps of:

selecting said diametric line to extend from said pivot axis of said pivot pin to cross said working tool substantially at said predetermined axis.

19. In the machine-effected method set forth in claim 18 further including the machine-executed steps of:

mounting a set of coils on the working tool such that the diametric line bisects a line extending between said coils and applying electrical currents to said coils for effecting said rotational and continuously opposing torques.

20. In the machine-effected method set forth in claim 17 further including the machine-executed steps of:

repeatedly applying said rotational torque alternately on opposite sides of the working tool holder for rotating the working tool holder in opposing directions such that said bias force is continuous while the working tool holder is rotating about said pivot pin.

21. An apparatus for positioning a work tool mounted on a rotary member having first and second coil supporting sides and a pivot aperture intermediate the supporting sides, a pivot pin means extending through the aperture for supporting the rotary member for rotation about a pivot axis, including, in combination:

first and second coil means respectively mounted on said first and second supporting sides, each of the coil means having a first and second coil ends;
unidirectional current conducting means respectively electrically connected to said coils for limiting current conduction through the coils to current in but one direction such that current flowing in the coils respectively induce opposing rotational torques, the unidirectional current conducting means limiting torque inducing current to but one of the coils in the respective opposite rotational directions of the rotary member; and
circuit means connected to the coils and the unidirectional current conducting means for supplying electrical signals thereto.

22. In the apparatus set forth in claim 21 further including, in combination:

said unidirectional current conducting means having two Zener diodes respectively connected to the coil means for limiting electrical current flow through the coils in one direction up to the reverse current conduction threshold of the Zener diodes, respectively.

* * * * *